United States Patent [19]

Schultz et al.

[11] Patent Number: 4,868,970

[45] Date of Patent: * Sep. 26, 1989

[54] METHOD OF MAKING AN ELECTRIC MOTOR

[75] Inventors: Roy D. Schultz, Dearborn, Mich.; Thomas R. England; A. Clark Altizer, both of Radford, Va.

[73] Assignee: Kolimorgen Corporation, Simsbury, Conn.

[*] Notice: The portion of the term of this patent subsequent to Jul. 14, 2004 has been disclaimed.

[21] Appl. No.: 27,933

[22] Filed: Mar. 19, 1987

Related U.S. Application Data

[63] Continuation-in-part of Ser. No. 709,763, Mar. 8, 1985, Pat. No. 4,679,313.

[51] Int. Cl.⁴ ............................................. H02K 15/06
[52] U.S. Cl. .................................... 29/596; 264/272.2; 310/43; 310/154
[58] Field of Search ....................... 29/596; 264/272.2; 310/154, 155, 254, 43

[56] References Cited

U.S. PATENT DOCUMENTS

| | | |
|---|---|---|
| 1,875,207 | 8/1932 | Apple . |
| 2,749,456 | 6/1956 | Leunberger . |
| 2,759,116 | 8/1956 | Glass . |
| 3,529,192 | 9/1970 | Davies . |
| 3,761,752 | 9/1973 | Anderson . |
| 3,827,141 | 8/1974 | Hallerback . |
| 3,841,133 | 10/1974 | Rice, Jr. . |
| 3,892,034 | 7/1975 | Arakelov et al. . |
| 4,053,800 | 10/1977 | Hanning et al. . |
| 4,191,903 | 3/1980 | Brenner . |
| 4,321,494 | 3/1982 | McNab . |
| 4,347,657 | 9/1982 | Barrera . |
| 4,492,889 | 1/1985 | Fukushi et al. . |
| 4,679,313 | 7/1987 | Schultz et al. ............ 29/596 |

FOREIGN PATENT DOCUMENTS 160957 12/1980 Japan .
837546 6/1960 United Kingdom .
881468 11/1961 United Kingdom .

OTHER PUBLICATIONS

Exhibit 1, May 8, 1984, Crumax Seminar, p. 3; Rare Earth Magnets(NdBFs), p. 44, Cross–Sect. View, "Surface Wound Type Motor".
Exhibit 4, "Slotless Construction for Small Synchronous Motors Using Samarium Cobalt Magnets" by Mesmondhalgh and Tipping, IEE Proc., Sep. 1982.
Exhibit 5, "Prospects for Slotless DC Motors in Railroad Propulsion" by Spooner, International Conference on Electrical Machines, Design Applications, Jul. 1982, Machines are in 1,000 horsepower range.
Exhibit 10, "Airgap Winding for Large Turbo Generators" by Davies IEE, 1984.
Exhibit 11, "Fully Slotless Turbo Generators" by Spooner, Proc. IEE, 1973.
Exhibit 12, "High–Speed Solid–Rotor Induction Motors" by Lakerveld, Phillips Technical Review, 1984.
Exhibit 13, Elcom 1984 Brochures, 3 bulletins by Pittman Corp., Jan. and May 1984, "A Novel Stator Winding Technique . . . ".
Exhibit 14, Technical Bulletin on Stycast 2762, Emerson & Cuming, 1981, describes Resin Material, pp. 10–11.

Primary Examiner—Carl E. Hall
Attorney, Agent, or Firm—Morgan & Finnegan

[57] ABSTRACT

A method of making an electric motor with the stator winding inside a slotless cylindrical stator shell.

5 Claims, 8 Drawing Sheets

METHOD OF MAKING AN ELECTRIC MOTOR

This is a continuation in part of U.S. Pat. No. 4,679,313, issued July 14, 1987, application Ser. No. 709,763 filed Mar. 8, 1985. This invention relates to high performance servo motors, and, more particularly, to such motors which make effective use of high energy product permanent magnets.

BACKGROUND OF THE INVENTION

Recently new types of permanent magnets have become available with significantly increased energy products. These new magnets comprise alloys of a rare earth (usually neodymium or praseodymium), iron, and a promoter of metastable phases (such as boron or gallium). For example, see application Ser. No. 470,968 filed Mar. 1, 1983, "Permanent Magnets and Method of Making Same", by Hazelton and Hadjipanayis assigned to the assignee hereof. Prior alnico (aluminum, nickel, cobalt) magnets usually have an energy product in the range of 5–7 MGOe, samarium-cobalt $SmCO_5$ magnets have an energy product of about 17 MGOe and the more expensive samarium-cobalt $Sm_2Co_{17}$ magnets have an energy product of about 27 MGOe. By comparison, Nd Fe B (neodymium, iron, boron) magnets are now available, for example, from Sumitomo Special Metals of Japan, with energy products in excess of 35 MGOe.

A great many motor designs have been created in the past, many taking advantage of improved permanent magnet characteristics. Slotted motor structures have been the most common in which copper windings are placed in laminated iron slots. The slotted designs provide a motor with a relatively small air gap in the magnetic circuit to achieve a desired high permeance. Magnets with increased energy products (e.g. samarium-cobalt) have proportionately reduced the magnet mass and resulted in effective inside-out brushless designs with rotating magnets and windings on the stator.

Non-slotted designs are also known where the windings are located in the air gap. Such slotless designs have proven effective primarily in large turbogenerators where expense is no object if it achieves operating efficiency. These turbogenerators employ sophisticated cooling systems and super-conducting materials to achieve high flux densities across a large air gap which accommodates the windings. Slotless designs in small motors have also been proposed but these have usually been either special purpose (e.g. high speed toroidally wound motors) or low performance motors not suitable for servo applications.

An object of the present invention is to provide a motor design which can make effective use of high energy product permanent magnet materials.

A more specific object is to provide a motor design for effectively using permanent magnets like the available NdFeB magnets having an energy product above 26 MGOe and preferably above 30 MGOe.

Still another object is to provide a method of making a high performance motor with windings located in the motor air gap.

Still another object is to provide a method for winding the coils of an air gap motor.

SUMMARY OF THE INVENTION

The obvious first inclination of a servo motor designer with a new high energy permanent magnet material is to use it as a replacement for prior permanent magnets in conventional designs and, after making design changes as dictated by the different characteristics, hoping that the new motor will have improved operating characteristics. Surprisingly, a similarly designed motor replacing samarium-cobalt magnets with higher energy product NdFeB magnets results in a motor with significantly lower peak torque in a range unsatisfactory for high performance servo applications. At room temperature NdFeB magnets, like samarium-cobalt magnets, do not show any significant demagnetization characteristics. At elevated temperatures above 100° C. and particularly at temperatures above 140° C., however, the coercivity of the NdFeB magnet falls off rapidly beyond a "knee" and, hence, demagnetization can occur. Since the demagnetization force applied to the magnet is proportional to armature current, a conventional design using NeFeB magnets will have limited peak current and, therefore, low peak torque despite the higher energy product magnets.

Conventional slotted designs also impose limitations on the air gap flux density because of the saturating characteristics of the iron in the teeth between slots. To increase the flux density would require wider teeth, which in turn would result in narrower slots and fewer copper windings. Because of the tradeoff between iron in the teeth and copper in the slots, such designs usually limit the permanent magnet flux density in the air gap to about 7 kilogauss. The permeance of the magnetic circuit determined by the magnet length compared to the air gap length is typically in the range of 4–6 in prior servo motor designs. Substitution of high energy produced magnets is also likely to result in their magnets that are impractical to make or handle during fabrication.

According to the invention, however, it has been found that the benefits of the new high energy product magnets (above 26 MGOe and preferably above 30 MGOe) can be realized by using a slotless design provided certain design parameters are observed. The stator winding is a multi-phase winding contained wholly within the magnetic air gap so that there are no saturation constraints in the magnetic circuit and flux densities above 7 kilogauss in the air gap can be used. The ratio of the magnet length to the gap length is in the range of 0.5 to 2.0. The ratio of the interpolar distance to the radial gap length is greater than 1.3. By staying within these design parameters motors can be designed using the high energy product magnets without danger of demagnetization and with significantly increased horsepower and continuous torque for a invention has a reduced inductance, which provides more power at high speeds, and a lack of reluctance torque and cogging.

A comparison of prior samarium-cobalt ($Sm_2CO_{17}$) magnet servo motors with motors of comparable size and weight made according to this invention indicates about a 70% increase in the dynamic continuous torque speed output performance and about an 80% increase in the intermittent performance.

In order to achieve the improved results it is important to properly secure the winding within the surrounding back iron cylindrical shell which provides the flux return path. Since the stator teeth are eliminated the winding must be secured to the stator structure with sufficient adhesion to withstand the maximum motor torque force throughout a range of operating temperatures. The winding must be rigid since movement of the conductors adversely affects the ability to generate torque. Also, heat must be dissipated from the windings. According to the invention the winding is encapsulated and bonded to the cylindrical stator shell by a ceramic filled epoxy selected to provide (1) a good mechanical strength (i.e. compressive strength, tensile strength, tensile shear), (2) good thermal conductivity, and (3) a coefficient of thermal expansion equal to or greater than that of other material in the stator structure. A suitable material of Nordbak 7451-0148/7450-0027 epoxy made by Rexnord Chemical Products, Inc. Another suitable material is Stycast 2762 made by Emerson and Cummings, a division of W.R. Grace & Co.

The invention further includes a method for assembling a motor with the winding in the air gap. The winding is formed using a cylindrical support with a reduced diameter section at one end. In one embodiment a fiberglass sleeve is placed around the cylindrical support in the uniform diameter portion and thereafter preformed coils are placed in position. It is understood that the fiberglass sleeve is not necessary to support the coils and that other embodiments do not use a sleeve. As is usually the case, the end turn portion of the winding is thicker because of crossing conductors. Using the method of the invention with a reduced diameter at one end of the support, the end turns at one end of the winding flare inwardly whereas the end turns at the other end flare outwardly. The winding can then be inserted into the cylindrical back iron shell starting with the inwardly flared end of the winding. The support can thereafter be withdrawn from the outwardly flared end of the winding leaving the fiberglass sleeve in as part of the stator structure. The winding is preferably encapsulated using a suitable resin after the winding is inserted into the stator shell. Notched laminations can be used in the stator shell to improve the shear strength of the bond between the winding and the stator shell. The notches are randomly distributed along the axial length of the machine to eliminate any appearance of a reluctance effect.

The invention additionally includes a method for winding the coils of the air gap motor to achieve a winding having a set of end turns at one end that flare inwardly toward the rotor, and another set at the other end that flare outwardly away from the rotor. To achieve the winding each coil is wound in a defined coil form and then held in that shape by means of a cement coating on the wire (bondable wire). The coils are then nested together on the cylindrical support to define the desired shape of the winding. Through this method the windings may be made automatically by machine.

GENERAL DESCRIPTION OF THE DRAWINGS

The foregoing and other objects of the invention will become obvious from the following detailed specification which incorporates the drawings and wherein.

DETAILED DESCRIPTION OF THE INVENTION

Figure 1:
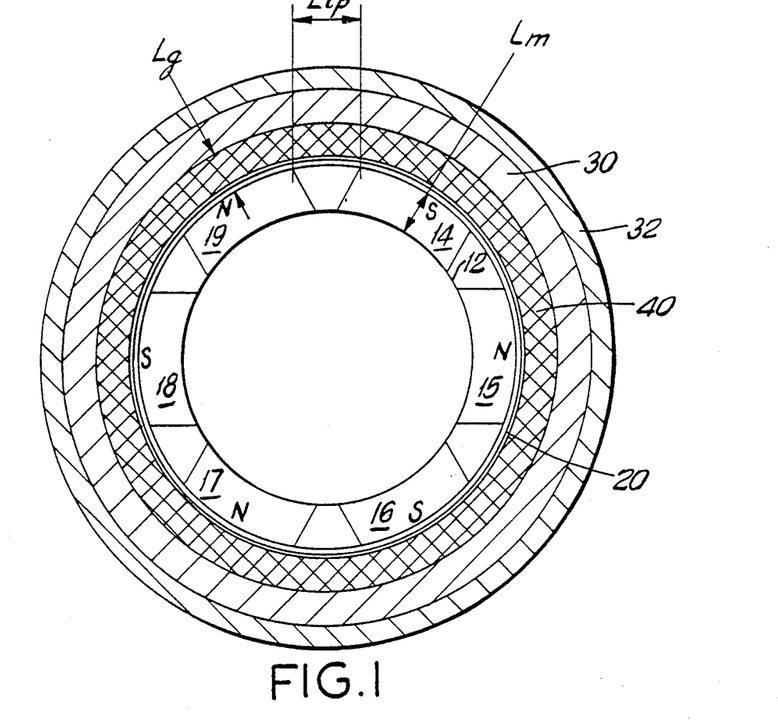
FIG. 1 is a cross-sectional end view of the motor according to the invention.
Figure 2A:
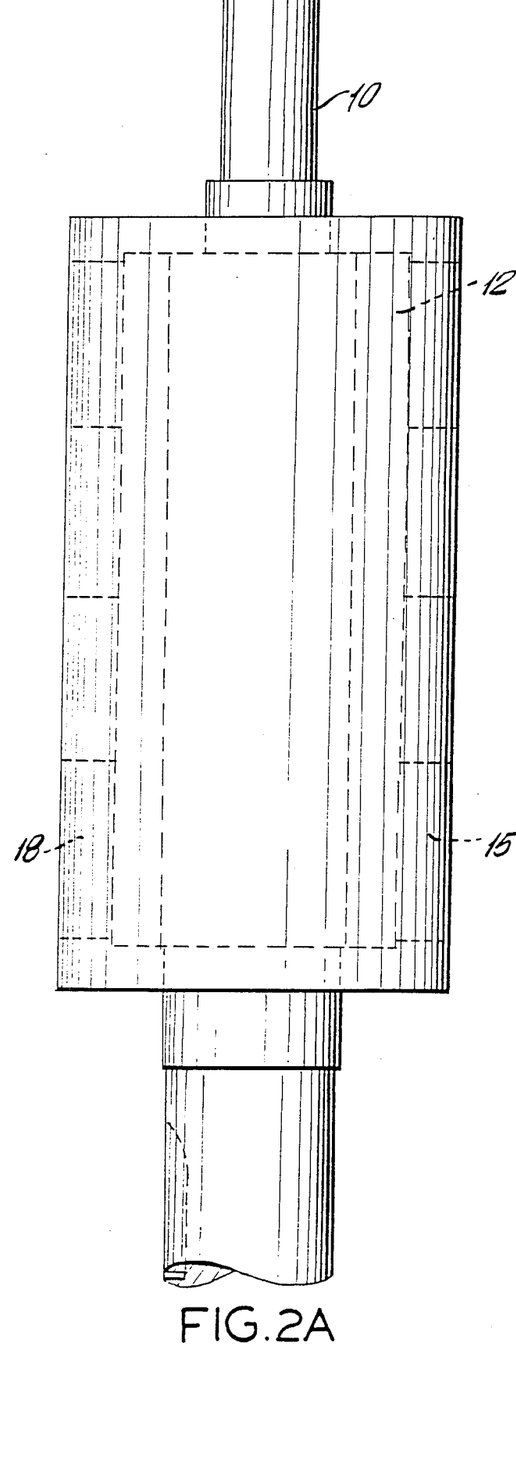
FIGS. 2a and 2b are a side view and end view respectively, of the rotor portion of the motor.
Figure 2B:
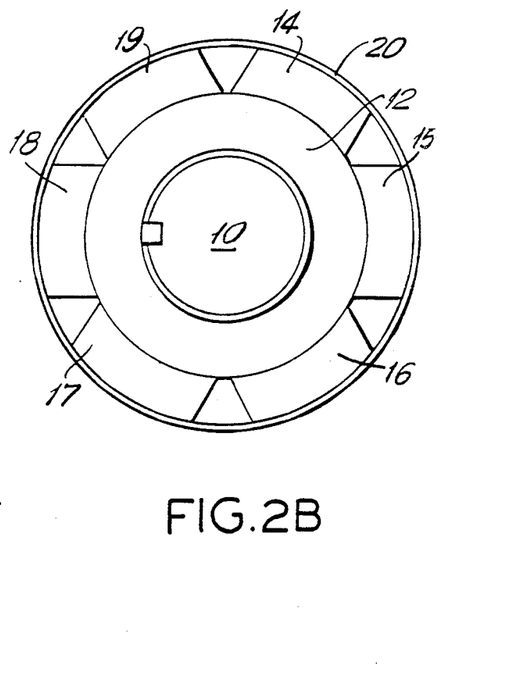
Figure 3:
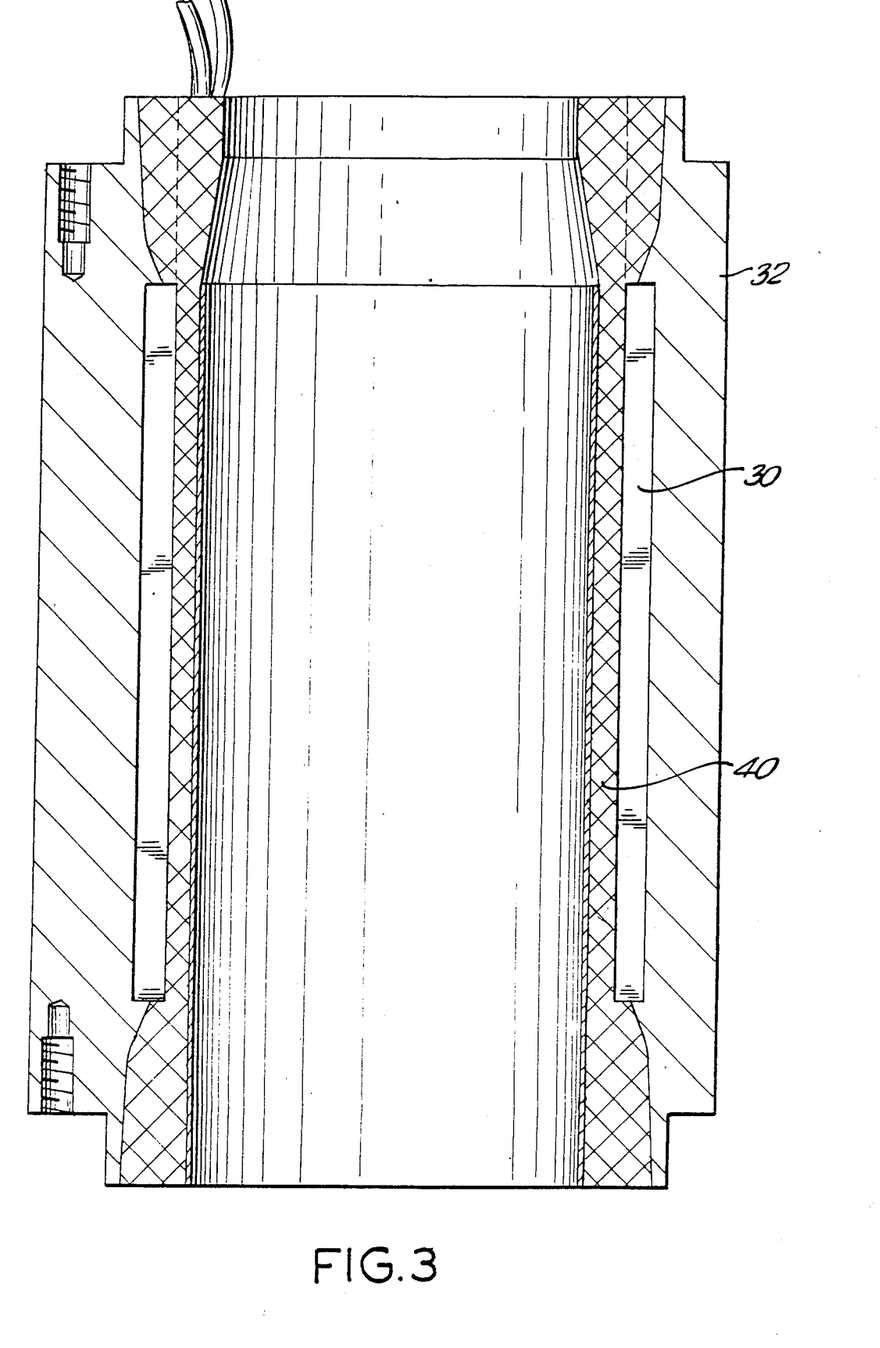
FIG. 3 is a cross-sectional view of the stator of the motor.

The general structure of the motor according to the invention is shown in FIGS. 1-3.

The motor includes a steel shaft 10 surrounded by a cylindrical iron sleeve 12 which provides the back iron for the rotor. Six permanent magnets 14-19 are mounted on sleeve 12 extending radially and are magnetized to provide alternating north and south poles as shown in FIG. 1. The magnets are high energy product magnets with energy products in excess of 26 MGOe (MegaGauss Oersteds) and preferably in excess of 30 MGOe. Suitable permanent magnets are those made from neodymium. Iron and boron such as available from Sumitomo Special Materials Co. Ltd. of Japan under the trade name NEOMAX-30H. The magnets are pressed arcuate shaped magnets and are mounted on the back iron sleeve surrounding shaft 10.

A banding 20 surrounds the rotor structure to hold the magnets in place under high speed centrifugal force conditions. Banding is accomplished using high strength Kevlar filaments which are dipped in epoxy and then wound around the rotor including one or more helical layers followed by several hoop layers.

The rotor can be constructed using six magnets each extending the full length of the rotor, or the magnets can be segmented as shown in FIG. 2A. An advantage to the segmented magnets is that a single motor design can produce motors of different horsepower ratings by simply changing the motor length and the number of magnet segments.

The stator structure includes a cylindrical outer shell 30 of laminated silicon steel which provides the outer back iron for the motor. The laminations are assembled and then cast in an aluminum outer housing 32. The windings 40 are formed and then mounted inside the cylindrical back iron shell. The stator structure is slotless and, hence, the windings are located in the motor air gap between the permanent magnets of the rotor and the outer back iron shell. Since there are no teeth in the stator, the entire inner cylindrical surface can be used by the copper of the windings. If desired, small notches can be randomly located in the internal circumference of the laminations for better bonding to the winding against torque forces produced in the motor.

Figure 4:
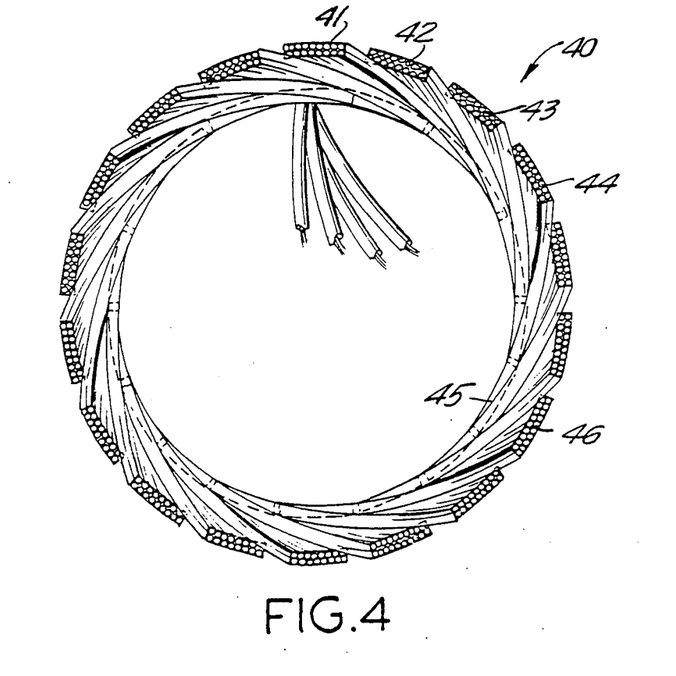
FIG. 4 is an illustration showing the lapped winding structure in the motor according to the invention.

The motor is the illustrative embodiment is a six pole three phase winding and therefore includes eighteen (18) coils in the winding. The coils are preformed and then placed in a lapped configuration as shown in FIG. 4. The coils of one phase are shaded in the illustration to show the relative orientation of the coils. A coil 41 of phase A is followed by a coil 42 of phase B which in turn is followed by a coil 43 of phase C, and then the sequence repeats. The longitudinal conductors 44 of one side of a coil are on the outside of the winding whereas the longitudinal conductors 45 of the other side of the same coil are on the inside of the winding beneath the conductors 46 of the next coil of the same phase. The coils are lapped in this fashion to provide a balanced three-phase six pole winding.

The winding is formed on a temporary cylindrical support 50 as shown in FIGS. 7 and 8 which is of a constant diameter starting from one end (to the left of FIG. 7A, 8A) and includes a reduced diameter portion 52 at the other end. In one embodiment a fiberglass sleeve 54 is placed surrounding the winding support (FIG. 7A, 8A) and the preformed coils 40 are then placed in position surrounding the sleeve (FIG. 7B, 8B). When the coils are in place, the end turns 48 at one end of the winding tend to flare inwardly as permittedly by the reduced diameter portion 52 of the support whereas the end turns 49 at the other end of the winding flare outwardly. The winding thus formed is then inserted into the stator structure 30, 32 as shown in FIG. 7C, 8C starting with the end at which the end turns 48 flare inwardly. Once the winding has been located within the stator shell as shown in FIG. 7D, 8D, support 50 can be removed from the outwardly flared end leaving the fiberglass sleeve 54 in place as part of the final stator structure. It is understood that in other embodiments the windings can be formed and inserted without using a sleeve and that removal of the support would still leave the coils in place.

Figure 8A:
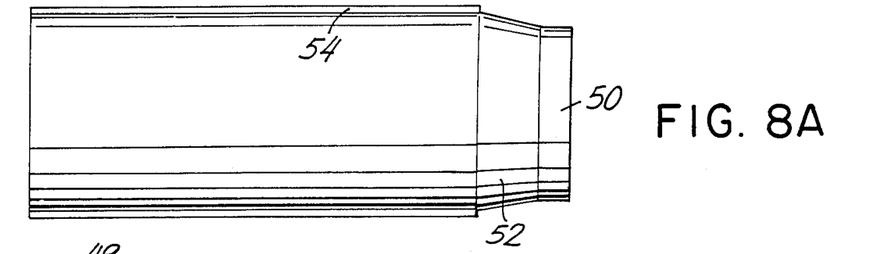
FIGS. 8A-8E are a series of illustrations showing a related method for forming the winding for the motor.
Figure 8B:
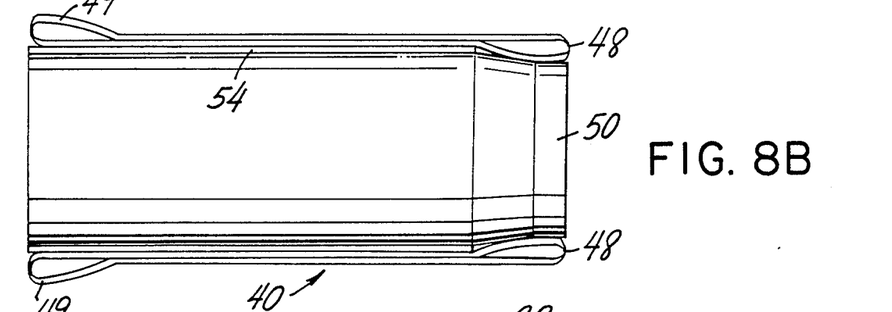
Figure 8C:
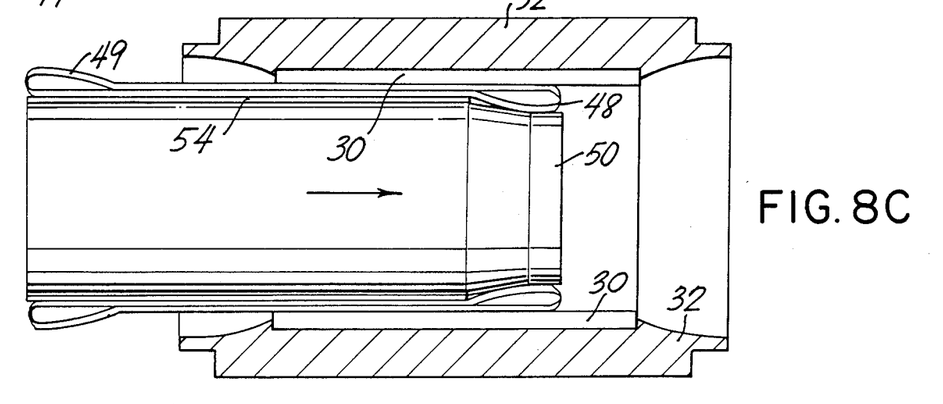
Figure 8D:
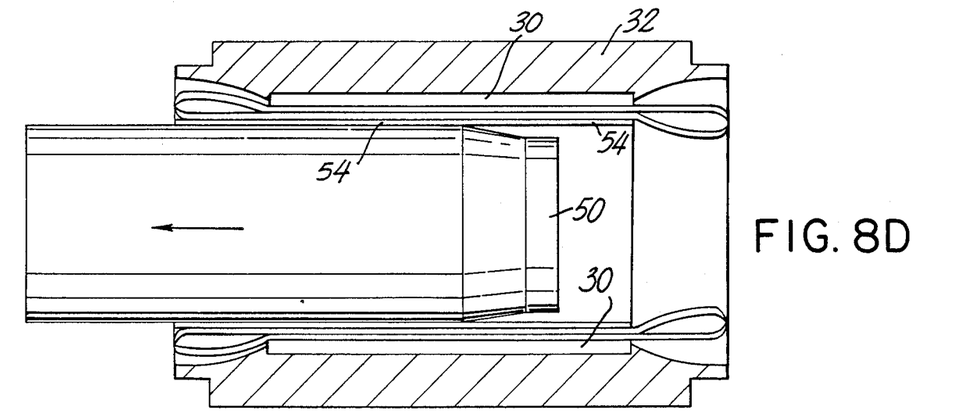
Figure 8E:
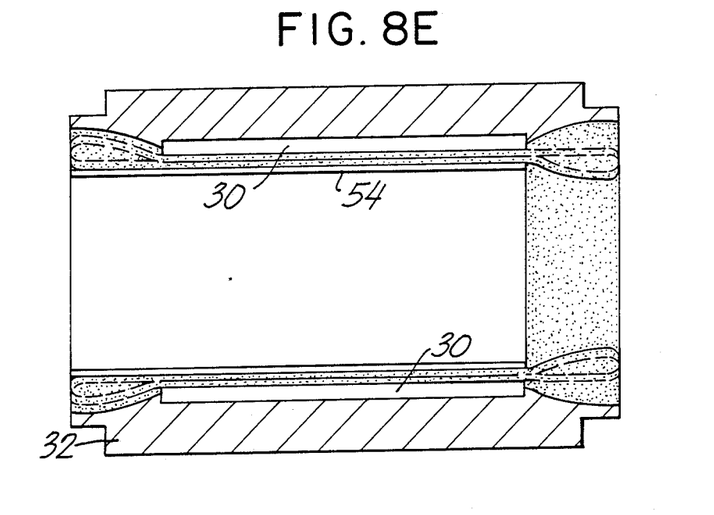

With the method described it is important that the preformed winding include inwardly flared end turns at one end and outwardly flared end turns at the other end. The inwardly flared end turns permit insertion of the preformed winding into the cylindrical stator shell. The outwardly flared end turns permit removal of the support after the winding is in place within the stator shell. When the winding is in place, it is impregnated with a suitable resin material to provide a rigid winding structure bonded to the back iron and housing of the stator shell. FIG. 7 shows the method where the winding 40 is impregnated with a suitable resin material prior to removing support 50. The winding, however, in some embodiments may be rigid enough so that the support 50 may be removed prior to impregnating the winding 40 with a suitable resin material as illustrated in FIGS. 8D and 8E.

Figures 9, 10, 11:
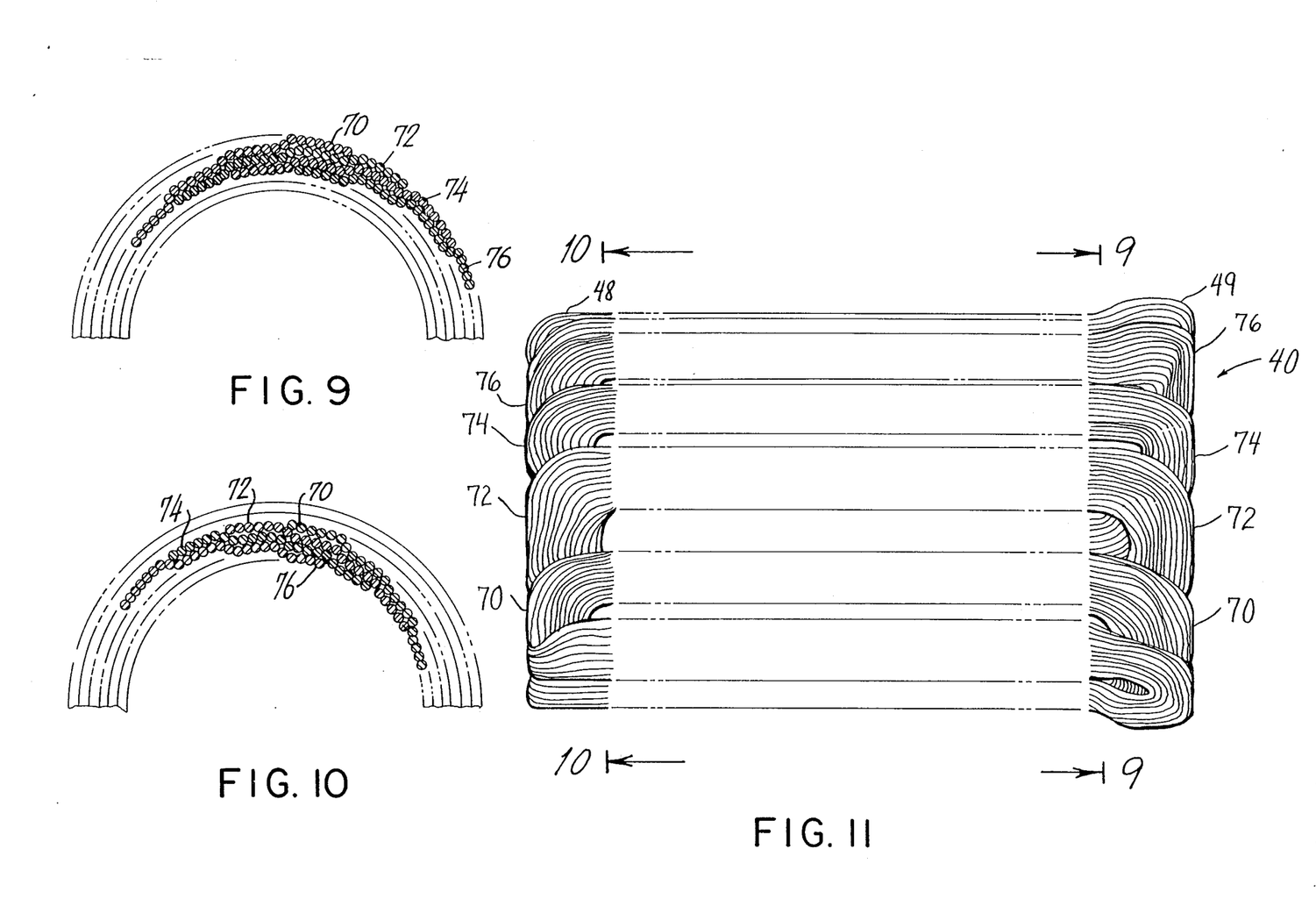
FIG. 9 is a partial cut-away view of a portion of the winding illustrating outwardly flared end turns.
FIG. 10 is a partial cut-away view of a portion of the winding illustrating inwardly flared end turns.
FIG. 11 is a perspective view of the winding 40 showing the nested coils.

The winding is formed by nesting phase coils. For the six (6) pole three (3) phase motor illustrated in FIGS. 1-3 eighteen phase coils are nested to form the winding (see FIGS. 4 and 11. FIG. 9 illustrates the nesting of coils from an axial view at the end having outwardly flared end turns. Similarly FIG. 10 illustrates the nesting of coils from an axial view at the end having inwardly flared end turns. The coils in the end turn regions both turn and raise continuously to achieve the three phase winding. Each coil has the same coil shape and nests on each of the other coils. Coils 70 and 76 of FIGS. 9, 10 and 11 are at a phase A, while coil 72 is at a phase B, and coil 74 is at a phase C. The arc distances over which a coil is the outer coil of the winding are defined by a coil form which is used to form each coil. The arc distance is related to the arc distance that the poles occupy within the motor.

Figure 12:
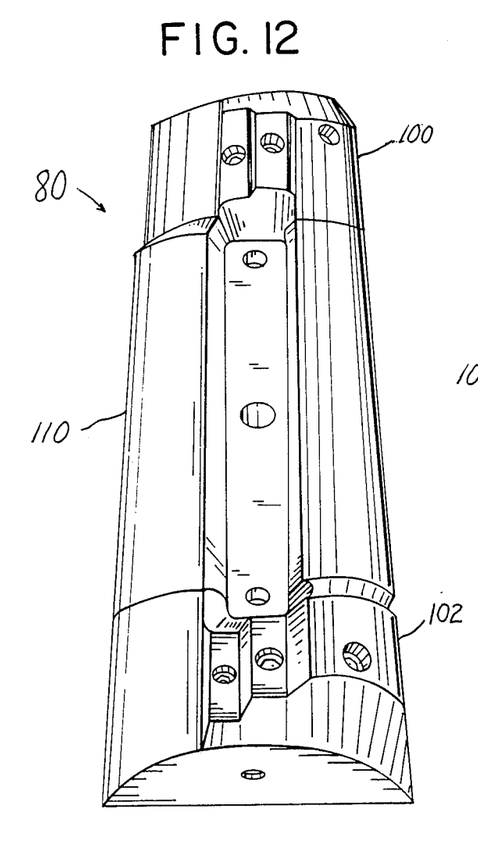
FIG. 12 is a perspective view of the bottom form of the coil form.
Figure 13:
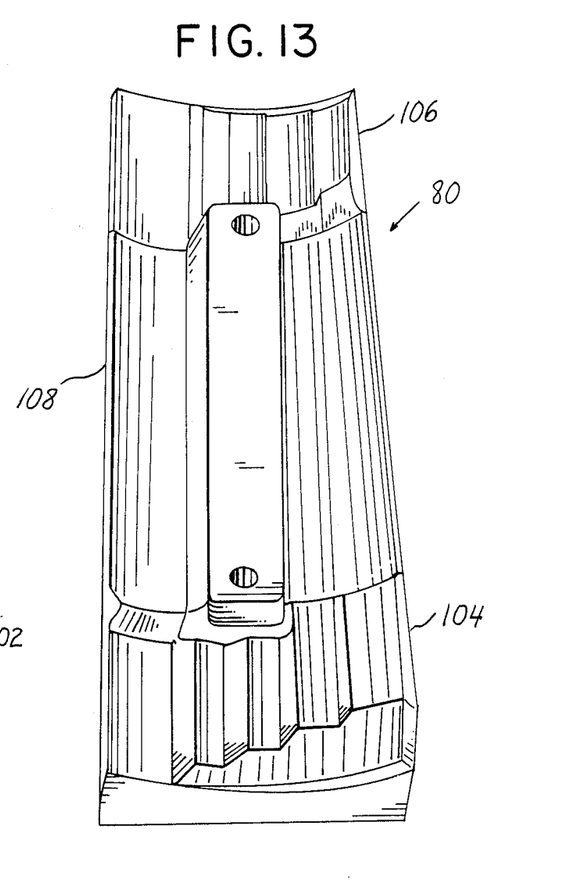
FIG. 13 is a perspective view of the top form of the coil form.

Referring to FIGS. 12 and 13, a preferred embodiment of the coil form 80 is illustrated.

A winding is formed by feeding wire into the coil form 80 which has a predetermined coil cavity to give the coil the desired shape. The wire is shaped against the coil form with the sectional lines being the points where the transitions in the coil are formed. The coil transitions can be seen in FIGS. 9, 10 and 11. Each coil is made up of a lower coil side and an upper coil side (see FIG. 4). As the coils go to successively smaller distances, the severity of the transitions to account for level change increases. The coil is bonded together while in the cavity by using bondable magnet wire to form the coil.

By forming the coils in this manner the process may be highly automated. For example a machine can wind the coils into the coil form 80. In addition, insertion of the coils into the shell 30 does not require any additional shaping or forming of the coils. Because the windings do not need to be molded in place and the coils are nested into their true positions, the generated back EMF is consistent between phases, resulting in smoother performance of the motor.

The coil form 80 includes a downward bottom form 100, an upward bottom form 102 and a bottom plate 110 as shown in FIG. 12. The coil form 80 further includes a downward top form 106, an upward top form 104 and a top plate 108 as shown in FIG. 13.

The resin material must be carefully selected for the motor according to the invention. The resin should have a good mechanical strength (i.e. compressive strength, tensile strength, tensile shear . . . ) in order to rigidify the winding since any freedom of movement adversely affects the ability of the winding to produce torque. The motor is designed for continuous operation at 150° C. and must be capable of withstanding peak temperatures of over 200° C. The thermal expansion of the resin must therefore be equal to or greater than the thermal expansion of the surrounding materials. The rating of the motor depends largely on the ability to dissipate heat from the windings and therefore the resin must also provide good thermal conductivity preferably in the range above 6 $(BTU)(in)/(hr)(ft^2)(°F.)$. This is particularly true with the compact motor design resulting from the invention. Ceramic fillers are preferably incorporated in the resin to improve thermal conductivity. However, the ceramic fillers must be non-conductive and non-magnetic in order to avoid eddy current and iron losses. Furthermore, the resin must have a low viscosity below 50,000 cps in the uncured state in order to properly impregnate the winding.

A suitable thermally conductive resin is Nordbak 7451-0148/7450-0027 epoxy available from Rexnord Chemical Products, Inc. The typical properties for this epoxy are as follows:

| APPLICATION CHARACTERISTICS | | | |
|---|---|---|---|
| Viscosity, cps (Pa-S) (ASTM D-2393) | | | |
| Resin | 77° F.(25° C.) | 250,000–300,000 | (250.0–300.0) |
| Hardener | 77° F.(25° C.) | 500–1,000 | (0.5–1.0) |
| Mixed | 77° F.(25° C.) | 6,000–8,000 | (6.0–8.0) |
|  | 185° F.(85° C.) | 500–600 | (0.5–0.6) |
| Gel Time, 50 gm mass (ASTM D-2472) 250° F.(121° C.) | 30–40 minutes | | |
| Cure Cycle | Cure at 180° F. for 4–6 hours followed by a post cure at a minimum of 250° F. for 3–4 hours. Post cure at operating temperature is recommended. | | |

-continued

| Mixing Ratio | | |
|---|---|---|
| By weight | 5.0 parts resin to 1.0 part hardener | |
| By volume | 3.0 parts resin to 1.0 part hardener | |
| Color | | |
| Resin | Black | |
| Hardener | Brown | |
| Mixed | Black | |
| Density, lbs./gal. (kg./l.) | | |
| Resin | 15.9 | (1.89) |
| Hardener | 9.9 | (1.19) |
| Mixed | 14.4 | (1.73) |

| TYPICAL CURED PROPERTIES | |
|---|---|
| Compressive Strength, psi (ASTM D-695) | 18,900 |
| Tensile Strength, psi (ASTM D-638) | 7,100 |
| Elongation, % (ASTM D-638) | 6.3 |
| Linear Shrinkage, in./in. (ASTM D-2566) | 0.007 |
| Hardness, Shore D 25° C. (ASTM D-2240) 180° C. | 90 / 67 |
| Tensile Shear, psi (ASTM D-1002) | 2,750 |
| Water Absorption, % (MIL-STD 406, Method 7031) | 0.20 |
| Outgassing, % TML (NASA Spec. ST-R-0022) CVCM | 0.32 / 0.06 |
| Coefficient of Thermal Expansion, $10^{-5}$ in/in °F. | 2.38 (below 120° F.) / 4.0 (120° F.–220° F.) / 6.8 (above 220° F.) |
| Thermal Conductivity at 70° C., BTU-in/hr-ft²-°F. | 6.5 |

| TYPICAL ELECTRICAL PROPERTIES | |
|---|---|
| Dielectric Constant (ASTM D-150) | |
| 100 Hz | 4.1 |
| 1k Hz | 4.1 |
| 10k Hz | 4.0 |
| 100k Hz | 4.0 |
| Disippation Factor (ASTM D-150) | |
| 100 Hz | 0.003 |
| 1k Hz | 0.004 |
| 10k Hz | 0.004 |
| 100k Hz | 0.008 |
| Volume Resistivity, ohm-cm (ASTM D-257) | $1.6 \times 10^{15}$ |
| Dielectric Strength, volts/ml (ASTM D-149) | 450 |

| VARIATIONS | |
|---|---|
| 7451-0012/7450-0027 | Unfilled, high elongation |
| 7451-0148/7450-0022 | More flexible, 70 Shore D |

Another suitable thermally conductive resin is Stycast 2762 epoxy resin available from Emerson & Cumming, a division of W.R. Grace & Company. The typical properties for this resin are as follows:

| Physical | | |
|---|---|---|
| Specific Gravity | 2.2 | |
| Flexural Strength, psi (kg/cm²) | | |
| at 70° F. (21° C.) | 18.800 (759) | |
| at 300° F. (149° C.) | 7.700 (539) | |
| at 482° F. (250° C.) | 4.500 (315) | |
| Flexural Modulus. psi (kg/cm²) | | |
| at 70° F. (21° C.) | $1.2 \times 10^6$ (84.000) | |
| at 300° F. (149° C.) | $1.0 \times 10^6$ (70.000) | |
| Water Absorption (% gain at 25° C. - 24 hours) | 0.02 | |
| Thermal conductivity, | | |
| (BTU)(in)/(hr)(ft²)(°F.) | 10 | |
| (cal)(cm)/(sec)(cm²)(°C.) | (0.0033) | |
| Hardness, Shore D | 96 | |
| Compressive Strength, psi (kg/cm²) | 18,000 (1,260) | |
| Elastic Modulus, psi (kg/cm²) | $1.2 \times 10^6$ (84,000) | |
| Thermal expansion, /°C. (/°F.) | $27 \times 10^6$ ($15 \times 10^6$) | |

| Electrical | Temperature | Dielectric Constant | Dissipation Factor |
|---|---|---|---|
| at 60 Hz | 70 | 4.3 | .007 |
|  | 300 | 4.4 | .008 |
| Dielectric Strength, volts/mil (kv/mm) | | 70° F. (21° C.) | 410 (16.0) |
| | | 300° F. (149° C.) | 380 (14.8) |
| Volume Resistivity, ohm-cm | | 70° F. (21° C.) | $10^{16}$ |
| | | 300° F. (140° C.) | $10^{11}$ |

When the winding is in place in the cylindrical outer shell of the stator, the epoxy is forced into the winding cavity at one end under pressure and is drawn through the winding by means of a vacuum applied at the other end. When the epoxy cures the winding becomes rigid and is securely bonded to the stator laminations. The ends of the winding cavity preferably flare out at both ends in the region of the end turns to increase the surface area. The end surfaces can be machined to provide a flat surface for good thermal contact with the end bells of the motor (not shown). In most cases, however, good thermal contact between the resin and the aluminum housing 32 will provide adequate heat dissipation.

Figure 5:
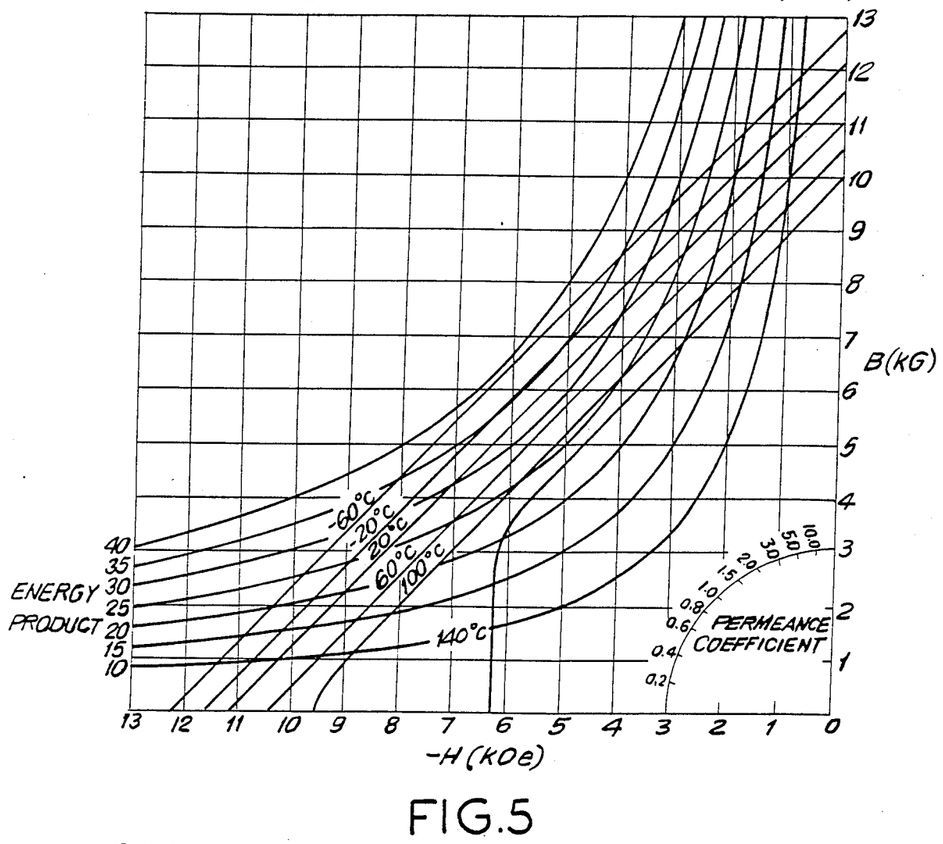
FIG. 5 is a diagram showing the demagnetization curves of a high energy product permanent magnet of the type used in the motor according to the invention.

The demagnetization curves of a suitable magnet material, for example, NEOMAX-30H from Sumitomo, are shown in FIG. 5. For temperatures below 100° C. the properties are substantially linear and, hence, no demagnetization is likely to occur when operating in this temperature range. At elevated temperatures above 100° C., however, there is a "knee" in the curve which, at 140° C., occurs at Bd=3,500 Gauss and Hd=6,000, Oersted. The rapid falloff of the coercivity at field strengths higher than 6,000 Oersteds can cause significant demagnetization of the magnets.

The permeance P is the operating slope of the magnet in a given circuit. The slope is given by:

$$P = \frac{Lm}{Lg} \frac{Ag}{Am}$$

where
Lm=magnet length in orientation direction
Lg=length of the magnetic gap
Am=area of magnet
Ag=area of gap
The allowable demagnetization field Ha is given by a line having slope P+1 and passing through (Hd,Bd) at the knee in the curve. This can be written as:

$$Ha = Hd - \frac{Bd}{(P + 1)}$$

Substituting for P and simplifying the equation becomes $$Ha = Hd - \frac{Bd\ Lg\ Am}{Lm\ Ag + LgAm} \text{ in Oersteds} \quad (1)$$

Thus, the maximum allowable demagnetization field Ha can be calculated for a given demagnetization characteristic and operating permeance P.

For design comparison purposes the worst case demagnetization field is when the stator currents are arranged such that the stator MMF directly opposes the magnet MMF. This is a realistic case since many servos are braked by shorting phase leads together, thus giving such a field alignment. Current in phase A is peak and current in phases B and C is ½ the peak current value. By symmetry, the armature H field is radial at the centerline of the magnet. Taking this path, the enclosed ampere turns per pole is:

$$NI = \frac{C}{2 \text{ Poles}} 2 \text{ (Ipeak)}$$

where C is series conductors per phase from Ampere's Law $$H = \frac{NI}{L} = \frac{C \text{ Ipeak}}{\text{Poles}(Lg + Lm) 2.021} \text{ in Oersteds} \quad (2)$$

Thus, for a given combination of poles, gap length, magnet length, conductors, and current, the applied demagnetization field H can be calculated.

Solving equation (2) for Ipeak and setting the allowable applied demagnetization field Ha equal to the applied field H, gives:

$$Ip = \frac{H \text{ Poles } (Lg + Lm) 2.021}{C} \text{ (in amperes)}$$

Substituting equation (1) for H gives:

$$Ip = \frac{[Hd(LmAg + LgAm) - BdAmLg]P(Lg + Lm)2.021}{(LmAg + LgAm)C} \quad (3)$$

Therefore, the maximum allowable peak current before demagnetization is expressed as a function of magnet material (Bd, Hd) and magnetic circuit design (poles, Lm, Lg, Am, Ag, C).

The various parameters of equation (3) for the conventional slotted design and the air gap winding design of the invention, both using the NdFeB magnet material shown in FIG. 5 with (Hd, Bd) of (6000,3500) are as follows:

TABLE 1

|  | Units | Invention | Slotted Motor |
|---|---|---|---|
| Bd | Gauss | 3500 | 3500 |
| Hd | Oersted | 6000 | 6000 |
| Lm | Inches | 0.38 | 0.125 |
| Lg | Inches | 0.30 | 0.049 |
| Am | in$^2$ | 1.127 | 0.741 |
| Ag | in$^2$ | 1.274 | 0.741 |
| Poles | — | 6 | 6 |
| C |  | 168 | 198 |
| Ipeak | Amperes | 223.8 | 53.4 |
| I$_{RMS}$ | Amperes | 158.2 | 37.8 |

As can be seen from Table 1, the air gap winding design allows more than 4 times the peak torque allowed by the conventional slotted design. With a maximum of 37.8A RMS current before demagnetization, the conventional slotted design does not offer the needed peak torque for a high response servo motor.

If the air gap is made relatively large, such as 0.3 inches in the illustrative embodiment of the invention, the reluctance of the magnetic path for flux generated in the stator is sufficiently high such that the flux, as seen by the magnets, remains below the level at which demagnetization is likely to occur. The ratio of the gap length (Lg) to the magnet length (Lm) [see FIG. 1], must be in the range between 0.5 and 2.0. The use of permeances in the range of 4-6, common in slotted motor structures, is undesirable since it results in either an excessively large amount of expensive permanent magnet material or a small air gap inadequate to hold the desired number of windings required for a high performance motor.

The ratio of the interpolar distance (Lip) to the radial gap length (Lg), as seen in FIG. 1, should be greater than 1.3. With high energy product magnets this ratio becomes important since a lower ratio results in ineffective use of the expensive permanent magnet materials due to increasingly high leakage flux.

Figure 6:
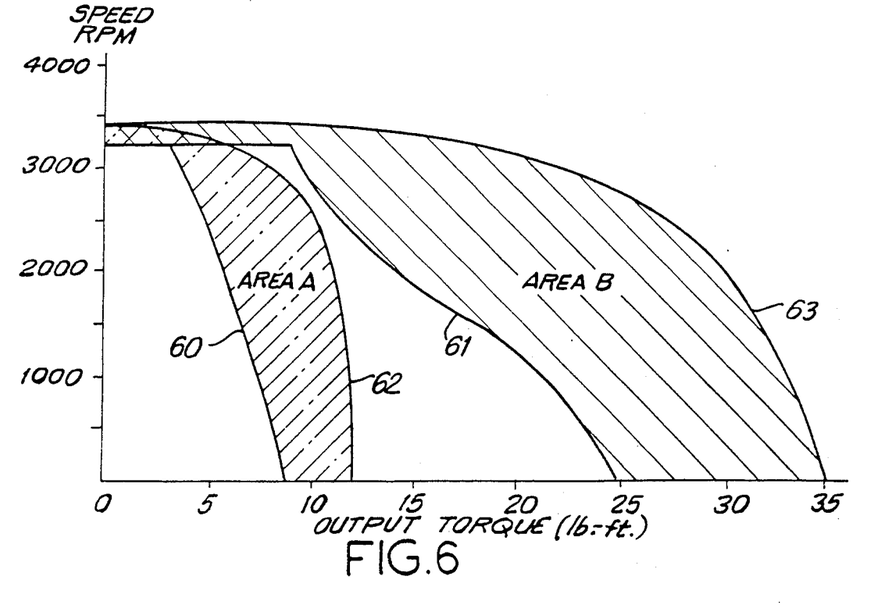
FIG. 6 is an illustration showing the improved operating performance of a motor made according to the invention as compared to a prior motor with samarium-cobalt magnets having a comparable size.
Figure 7A:
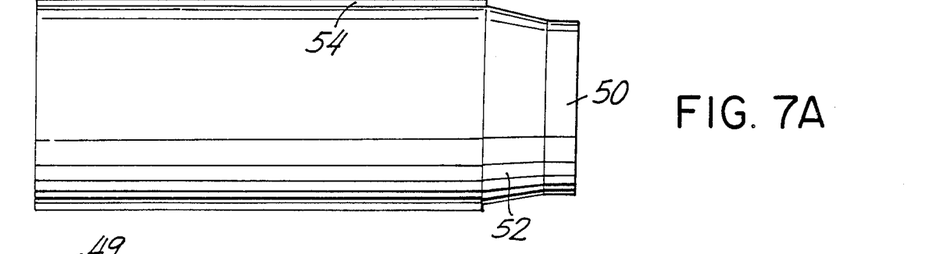
FIGS. 7A-7D are a series of illustrations showing the method for forming the winding for the motor.
Figure 7B:
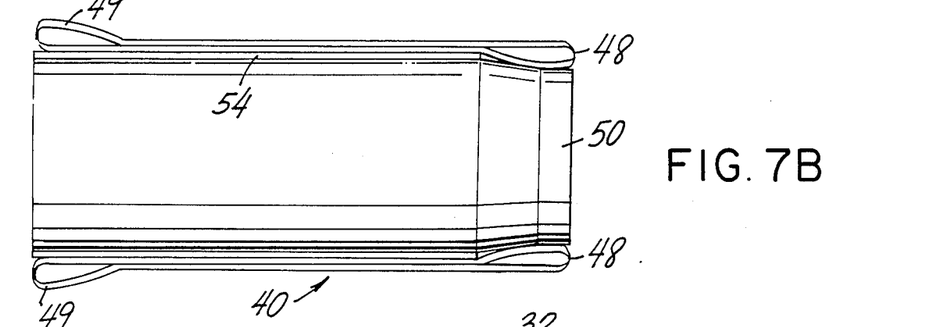
Figure 7C:
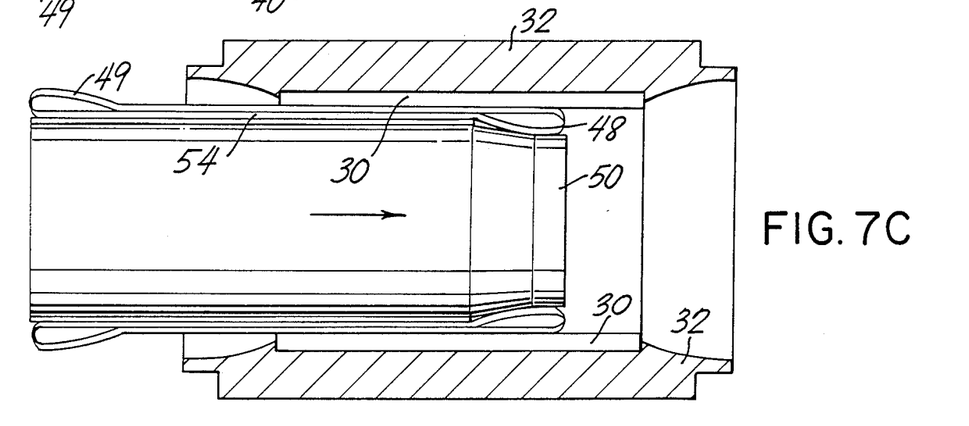
Figure 7D:
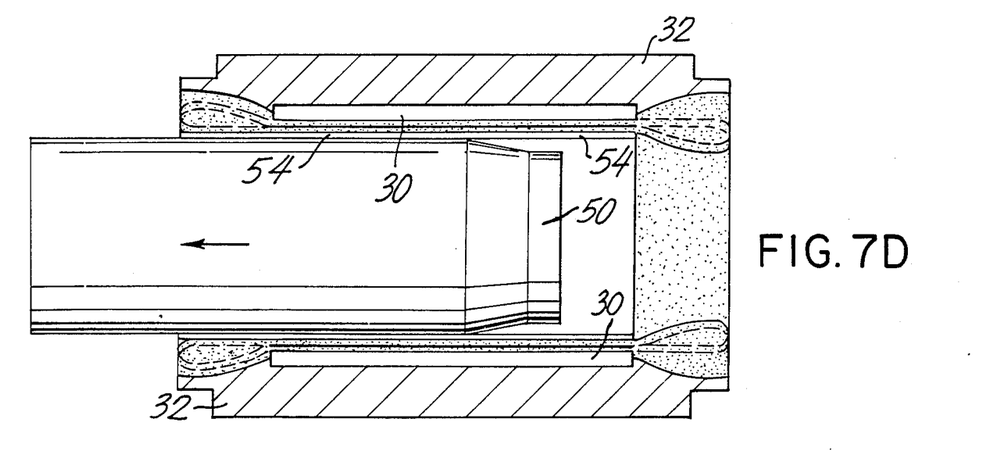

FIG. 6 is a diagram illustrating the dynamic comparison of two motors with approximately the same outside physical dimensions. Curves 60 and 61 are for a conventional slotted structure with samarium-cobalt (Sm$_2$Co$_{17}$) magnets having an energy product of about 27 MGOe whereas curves 62 and 63 are for a motor according to the invention including permanent magnets of the NdFeB magnets with an energy product of about 35 MGOe. Area A is FIG. 6 represents an increase of about 70% additional continuous performance while area B shows about an 80% increase in the intermittent performance. These improvements in the operating characteristics are achieved with an increase of only about 30% in the energy product of the magnets.

Although only one illustrative embodiment of the invention has been described in detail, there obviously are numerous variations within the scope of this invention. The invention is more particularly defined in the appended claims.

We claim:

1. A method of making an electric motor with a stator winding having coil end turns at axial ends thereof inside a slotless cylindrical stator shell of magnetic material comprising the steps of:
    forming a slotless cylindrical stator shell of magnetic material;
    creating a generally cylindrical support with a reduced diameter portion at one end;
    forming the winding around said support from preformed coils such that
        the coiled end turns at one end of the stator winding are at the reduced diameter portion of said support and flare inwardly along said reduced diameter portion, and
        the coil end turns at the other end of the stator winding are at the other end of said support and flair outwardly;
    inserting said winding into said cylindrical stator shell starting with said inwardly flared end coils while the winding is supported by said support;
    removing said support from said winding; and
    impregnating said winding with a resin to secure said winding inside said stator shell.

2. The method according to claim 1 wherein said resin has a thermal conductivity in excess of 6 (BTU)-(in)/(hr)(ft$^2$)(°F.).

3. The method according to claim 1 wherein said resin has a coefficient of thermal expansion equal to or greater than that of the cylindrical stator shell.

4. The method according to claim 1 wherein said resin has a viscosity below 50,000 cps in the uncured state.

5. The method according to claim 1 wherein said resin is an epoxy filled with a non-conductive and non-magnetic ceramic.

* * * * *